(12) United States Patent
Stigsson et al.

(10) Patent No.: US 10,988,707 B2
(45) Date of Patent: Apr. 27, 2021

(54) METHOD FOR THERMAL TREATMENT OF TALL OIL PITCH (TOP)

(71) Applicant: SUNPINE AB, Piteå (SE)

(72) Inventors: Lars Stigsson, Bjärred (SE); Valeri Naydenov, Luleå (SE); Christian Hulteberg, Bunkeflostrand (SE)

(73) Assignee: SUNPINE AB, Piteå (SE)

( * ) Notice: Subject to any disclaimer, the term of this patent is extended or adjusted under 35 U.S.C. 154(b) by 0 days.

(21) Appl. No.: 16/765,157

(22) PCT Filed: Nov. 20, 2018

(86) PCT No.: PCT/SE2018/051202
§ 371 (c)(1),
(2) Date: May 18, 2020

(87) PCT Pub. No.: WO2019/103684
PCT Pub. Date: May 31, 2019

(65) Prior Publication Data
US 2020/0347319 A1  Nov. 5, 2020

(30) Foreign Application Priority Data

Nov. 21, 2017 (SE) .................................. 1751431-6
Dec. 13, 2017 (SE) .................................. 1751542-0

(51) Int. Cl.
C11B 13/00 (2006.01)
C10G 9/00 (2006.01)
(Continued)

(52) U.S. Cl.
CPC ................ *C11B 13/00* (2013.01); *C10G 9/00* (2013.01); *C10L 1/02* (2013.01); *C10G 11/02* (2013.01);
(Continued)

(58) Field of Classification Search
CPC .... C11B 13/00; C10L 1/02; C10L 2200/0469; C10L 2290/06; C10G 3/40; C10G 3/42;
(Continued)

(56) References Cited

U.S. PATENT DOCUMENTS 3,926,936 A * 12/1975 Lehtinen ............... C11B 13/005
530/208
2016/0304718 A1* 10/2016 Bindschedler ......... C09J 193/04

FOREIGN PATENT DOCUMENTS

EP     0122895 A2   10/1984
WO  WO-2011/117474 A1   9/2011
(Continued)

OTHER PUBLICATIONS

Adewale et al., 'Thermal and Rheological Properties of Crude Tall Oil for Use in Biodiesel Production' in: Processes, vol. 5, Issue 59, pp. 1-12.; see p. 5, Table 1, Oct. 15, 2017.
(Continued)

Primary Examiner — Yate' K Cutliff
(74) Attorney, Agent, or Firm — Moser Taboada (57) ABSTRACT The present invention describes a method for the treatment of tall oil pitch (TOP), said method comprising heating the TOP and optionally additives including water and steam to a temperature of at least 300° C.; maintaining the temperature in the reactor at 300° C. or higher for a period of time to enable thermal treatment of the TOP to act on components thereof to produce fatty acids and/or rosin acids, and/or derivatives thereof, and/or unsaponifiables and/or derivatives having lower molecular weight compared to the high molecular weight components with molecular weights of at least 350 g/mole present in the original TOP, to yield a modified TOP material with lower viscosity.

26 Claims, 3 Drawing Sheets

| Experiment # | Reaction conditions | Viscosity (cSt) | Acid number (mg KOH/g) | Resin content (%) |
|---|---|---|---|---|
| Original sample | - | 111.3 | 46.8 | 17.35 |
| 1 | 220 °C, 60 min | 108.3 | 46.3 | 17.03 |
| 2 | 300 °C, 120 min | 43.4 | 71.9 | 14.88 |
| 3 | 325 °C, 120 min | 27.8 | 69.9 | 12.94 |
| 4 | 350°C, 30 min | 18.6 | 58.9 | 10.16 |
| 5 | 350°C, 60 min | 19.6 | 66.7 | 11.50 |
| 6 | 350°C, 120 min | 11.9 | 59.4 | 8.38 |

Table 2. Viscosity, acid number and resin content (51) Int. Cl.
  *C10L 1/02* (2006.01)
  *C10G 11/02* (2006.01)
(52) U.S. Cl.
  CPC ............... *C10G 2300/4006* (2013.01); *C10L 2200/0469* (2013.01); *C10L 2290/06* (2013.01)
(58) Field of Classification Search
  CPC .... C10G 3/50; C10G 9/00; C10G 2300/4006; C10G 11/02; C10G 11/04
  See application file for complete search history.

(56) References Cited

FOREIGN PATENT DOCUMENTS

| WO | WO-2011117474 A1 * | 9/2011 | ............... C10L 1/08 |
| --- | --- | --- | --- |
| WO | WO-2011/130525 A1 | 10/2011 | |
| WO | WO-2014/167181 A1 | 10/2014 | |
| WO | WO-2016/189200 A1 | 12/2016 | |
| WO | WO-2017/114715 A1 | 7/2017 | |
| WO | WO-2017114715 A1 * | 7/2017 | ............. C10G 45/02 |
| WO | WO-2018/024728 A1 | 2/2018 | |

OTHER PUBLICATIONS

International Search Report on Application No. PCT/SE2018/051202 dated Feb. 18, 2019.

* cited by examiner

| Experiment # | Starting material | Temperature (°C) | Residence time (min) |
|---|---|---|---|
| 1 | TOP | 220 | 60 |
| 2 | TOP | 300 | 120 |
| 3 | TOP | 325 | 120 |
| 4 | TOP | 350 | 30 |
| 5 | TOP | 350 | 60 |
| 6 | TOP | 350 | 120 |

Fig. 1/Table 1. Description of different experiments

| Experiment # | Reaction conditions | Viscosity (cSt) | Acid number (mg KOH/g) | Resin content (%) |
|---|---|---|---|---|
| Original sample | - | 111.3 | 46.8 | 17.35 |
| 1 | 220 °C, 60 min | 108.3 | 46.3 | 17.03 |
| 2 | 300 °C, 120 min | 43.4 | 71.9 | 14.88 |
| 3 | 325 °C, 120 min | 27.8 | 69.9 | 12.94 |
| 4 | 350°C, 30 min | 18.6 | 58.9 | 10.16 |
| 5 | 350°C, 60 min | 19.6 | 66.7 | 11.50 |
| 6 | 350°C, 120 min | 11.9 | 59.4 | 8.38 |

Fig. 2/Table 2. Viscosity, acid number and resin content

Fig. 3. Viscosity of the original sample and samples with a residence time of 2 hours. Temperatures at 220, 300, 325 and 350°C.

Fig. 4. Viscosity of the original sample and samples with varying residence time within 2 hours and temperature of 350°C

Fig. 5. Flow chart

METHOD FOR THERMAL TREATMENT OF TALL OIL PITCH (TOP)

FIELD OF THE INVENTION

The present invention relates to a thermal treatment of tall oil pitch (TOP).

TECHNICAL BACKGROUND

TOP is a by-product obtained when processing of crude tall oil (CTO) is performed. The TOP contains varying amounts of fatty acids (straight hydrocarbon chain ranging from C12-C26 of varying unsaturation degree i.e. zero, one, two, three, etc. double bonds and containing primary/terminal carboxylic acid group) and rosin acids (typical examples being Pimaric, iso-Pimaric, Sandaracopimaric, Levopimaric, Palustric, Abietic, Dehydroabietic and Neoabietic acids occasionally referred to as resin acids) as well as their derivatives which are reaction products between fatty- or respectively rosin acids and the so called neutral components present within CTO and where resulting TOP is typically characterized with a high viscosity.

The present invention is directed to a thermal treatment of TOP to provide a TOP fraction which is easier to handle in further processing and wherefrom valuable organic components boiling at atmospheric pressures between about 150° C. and 450° C. and optionally wood sterols can be recovered.

There are methods involving increased temperatures when processing TOP. For instance, in U.S. Pat. No. 3,926,936 a process is disclosed wherein TOP is thermally treated in a temperature range of 200-300° C. with an alkali reagent in order to saponify fatty acids and liberate sterols from their esters. The reaction product is thereafter acidified to liberate fatty acids, rosin acids and sterols. The material is thereafter distilled. Saponification followed by acidification is a classical procedure for liberating the carboxylic acids present within TOP and is procedure mainly practiced for recovery of valuable sterols present in the TOP. Saponification is a cumbersome procedure which also generates a salty brine which has to be recycled or disposed of.

The present invention aims on providing a simple and effective treatment of TOP without a saponification step which provides a TOP fraction which is comparatively easy to process further into valuable chemicals including renewable fuel chemicals and optionally sterols.

SUMMARY OF THE INVENTION

The stated purpose above is achieved by a method for the treatment of tall oil pitch (TOP), said method comprising:
heating the TOP in a reactor to a temperature of at least 300° C.;
maintaining the temperature in the reactor at 300° C. or higher under a period of time sufficient to enable cracking/cleaving of high molecular weight components in the TOP generating fatty acids and/or rosin acids, and/or derivatives thereof, and/or unsaponifiables and/or their derivatives, which have lower molecular weight compared to the high molecular weight components in the original TOP, thereby yielding a modified TOP phase having lower viscosity compared to the original TOP.

Also the resin acid content may be lower and the acid number may be higher in the modified TOP produced according to the present invention in comparison to the original TOP.

Furthermore, according to one specific embodiment of the present invention, the original TOP and components therein has an average molecular weight substantially above 350 g/mol, e.g. in the range of 350-800 g/mol, and the generated fatty acids and/or rosin acids, and/or derivatives thereof, and/or unsaponifiables and/or their derivatives have an average molecular weight below 350 g/mol, such as molecular weight in the range of 200-330 g/mol. The thermal treatment according to the present invention thus provides a modified TOP with a lower average molecular weight than the original TOP starting material.

The method optionally includes recovering at least a portion of the lower molecular weight fraction created within the modified TOP by charging the thermally treated TOP to a fractionation step thus separating at least a fraction of the lower boiling tall pitch fraction.

The method optionally includes purification steps prior further processing or use for energy generation where purification steps include the removal of ash, other impurities, etc.

The present invention is not directed to a transesterification procedure for liberating sterols such as e.g. disclosed in WO2016/189200 or deoxygenation of TOP as disclosed in WO2014/167181. The present invention relates to a thermal or hydrothermal treatment which is straight forward and optimized simply by adjusting the time/temperature relation in the reactor to achieve cleavage of selected chemical bonds. Optionally, the treatment of TOP is performed in the presence of water or steam. Moreover, the focus of the method according to the present invention is to decrease the viscosity of the TOP fraction produced and to further simplify purification from salts and other impurities thus enabling further processing of TOP fractions into renewable fuels and materials or fine chemicals.

The traditional method used in the petroleum industry for lowering the viscosity is so called visbreaking. This method is used to lower the viscosity of the residues obtained from the vacuum distillation in a refinery, and it is typically performed at temperatures ranging between 455 and 510° C. and short residence times, from 1 to 8 minutes. As will be evident below, there are no known methods described for the treatment of TOP to lower the viscosity say five-fold or more (measured in centistokes, cSt), say processes employing temperatures in the range of 300° C. to about 375° C. Higher temperatures are required when processing heavy fossil oil fractions as the treatment involves/targets cleavage of carbon-carbon bonds, often within an aromatic arrangement which are much more stable than bonds targeted within the present invention. As it comprises of treatment of material with biological origin the treatment within present invention affects mostly carbon-oxygen and/or double bonds where both are activated at considerably lower temperatures compared to carbon-carbon bonds. Thus, the method according to the present invention is not a method intended at temperatures and residence times used in visbreaking of petroleum oils. This will also be further shown below.

As understood from above, the present invention is directed to a method which may be employed in an existing CTO processing plant. Therefore, according to one embodiment of the present invention, the TOP to be treated is a fraction obtained and separated (off) during the processing of crude tall oil (CTO) in a fractionation plant, such as in CTO fractionation processes performed in several steps under vacuum. The TOP residue fraction represents typically between 20-30% by weight of CTO processed. The TOP typically has an acid value in the range of 30-60 (mg KOH/g) and already comprises a significant amount of valuable carboxylic acids in their free acid form. However, even larger amounts of these valuable components are present within the TOP as carboxylic acid derivatives i.e. as in their bound form, such examples but not limited to are fatty acid steryl esters, fatty acid esters with fatty alcohols, etc.

As discussed briefly above, in WO2016/189200 there is disclosed a method of recovering sterols from tall oil pitch which contains steryl esters, said method comprising a transesterification reaction with a lower alcohol. Typically, the transesterification reaction is preferably carried out at a pressure in the range from 60 to 120 bar (abs), and at a temperature 250° C. or higher and, in particular below 300° C., for example at 250-295° C. It is mentioned that optionally a co-solvent, such as hydrocarbon, carbon dioxide or water may be added to adjust the viscosity in the reaction mixture, in particular to lower the viscosity.

It should be noted that the method disclosed in WO2016/189200 is not directed to a thermal treatment performed in a suitable temperature range and residence time to decrease the viscosity of TOP, such as according to the present invention. Fact is that the step of optionally lowering the viscosity according to WO2016/189200 is performed by adding a substance to accomplish a chemical reaction (transesterification), and not by the thermal treatment as such.

The inventors of the present invention have surprisingly found that TOP of improved i.e. lower viscosity can be obtained through a simple and effective treatment at considerably lower temperatures compared to previously known art for treatment of fossil oils. There are several reasons why a decreased viscosity of the TOP fraction is of interest. First of all, it may decrease or completely eliminate the amount of light fraction used otherwise to lower the viscosity of TOP for transport to burners and use as a fuel in limekilns or steam generators. Secondly, it is considerably easier to purify a low viscosity TOP for example by acid refining a procedure commonly used on CTO. Thirdly, it its advantageous with a lower viscosity of the TOP for further downstream processing for recovery of valuable components from a TOP thermally or hydrothermally treated in accordance with the present invention.

Specific Embodiments of the Invention

Below different embodiments of the present invention are disclosed.

Certain crude tall oils (CTOs) contain a considerable portion of tall oil pitch components, in particular tall oils derived from pulping hardwood or wherein hardwood is a large proportion of the wood feed sent to the pulp mill. The crude tall oils obtained when pulping hardwood and softwood are considered to be of a lower quality for tall oil fractionators and contain considerably less or at the extreme cases no rosin acids at all. Crude tall oil quality is often measured by its acid number. When pulping pine wood only, it is possible to obtain tall oils with acid numbers (mg KOH/g) in the range 160-165, while mills pulping hardwoods only or a mix of hardwood and softwood, acid numbers of the resulting tall oil may be below 140 and even below 130. These low acid number tall oils comprise considerably larger amounts of tall oil pitch forming components and in one embodiment of the present invention the TOP charged to thermal treatments in accordance with the processes described herein comprises, is a fraction of, is derived from and/or admixed with a low acid number crude tall oil. According to one embodiment the TOP is a fraction of a low acid number crude tall oil to be treated, and in another embodiment the TOP is admixed with a low acid number crude tall oil. In both cases, the entire mixture is intended to be treated. In other words, according to the present invention low acid number crude tall oil may be treated alone or together with tall oil pitch obtained and separated off during the processing of any quality crude tall oil (CTO).

Low acid number crude tall oils are characterized by having an acid number below about 140, not seldom below about 130. Acid numbers in tall oils are measured in accordance with standard procedures know to the artisan skilled in the art for example the procedure described in standard PCTM 1 (ISSUED—1996) "Method of determining acid number of tall oil using a potentiometric end point" (Pine Chemicals Association) and is expressed in milligrams potassium hydroxide needed to neutralize one gram sample (mg KOH/g). As may be understood from above, according to one specific embodiment of the present invention, the TOP to be treated comprises a fraction of a low acid value crude tall oil having an acid number below about 140, preferably below about 130. According to one specific embodiment of the present invention the thermally and/or hydrothermally treated TOP is at least partly recycled and charged as feed to the fractionation plant for fractionation of crude tall oil already generating TOP stream. Prior to such charge into the fractionation plant, the TOP could be further modified so that only valuable components are send to the fractionation plant, say modification employing "stripping" of the lighter gases and optionally "de-pitched", i.e. heavy fraction removed thus ensuring that harmful colour compounds and salts do not accumulate in the CTO process. Any equipment providing separation at elevated temperatures with/without vacuum can be employed for TOP modification above prior to the charge in the fractionation plant. Such equipment, but not limited to these, can be flashing, stripping, thin-film and falling-film evaporators and combinations thereof and can comprise of one or more steps in parallel or series.

In one preferred embodiment thermally and/or hydrothermally treated TOP is fully or partly charged to a separate fractionation plant, which plant is designed to handle low acid value crude tall oil as well as mixtures thereof. Such a separate fractionation plant may be a crude tall oil fractionation plant comprising at least means for producing, condensing and discharging three fractions which are a light fraction comprised of components having boiling points below 150° C., a distillate fraction say fraction comprising valuable components boiling in the range 150-450° C. at atmospheric pressure and a heavier bottom fraction boiling over 450° C. at atmospheric pressure. When utilizing a considerable proportion of low quality CTO the distillate fraction is a fraction rich in fatty acids. Thus, the resulting TOP or heavy bottom residue from such a fractionation plant will be depleted in valuable component boiling in the range of 150-450° C. at atmospheric pressure and could conveniently be discharged and used as biofuel or as feedstock to refineries as disclosed further below. It is to be understood that such a fractionation plant, as above, can be adjacent to a conventional CTO fractionation plant or placed elsewhere.

Furthermore, according to one embodiment of the present invention, at least part of the thermally or hydrothermally treated TOP is sent to a fractionation plant already producing TOP (see FIG. 5 and discussion below) along with other valuable components such as fatty- and rosin acids, heads, de-pitched tall oil, refined tall diesel, etc. Moreover, according to yet another embodiment said at least part of the thermally or hydrothermally treated TOP is sent to a fractionation plant comprising at least an evaporator and a condenser, said fractionation plant separating the TOP feed into at least one stream rich in components having boiling point between 150-450° C. and one stream rich in tall oil pitch (see also FIG. 5 and discussion below) i.e. components having boiling points over 450° C.

Moreover, and based on the above, according to one specific embodiment of the present invention, at least part of the thermally and/or hydrothermally treated TOP after optional purification from light gases, salts and other impurities is sent to said fractionation plant thus producing a TOP depleted in components having boiling point between 150-450° C. According to another specific embodiment of the present invention, said at least part of the thermally and/or hydrothermally treated, i.e. modified, TOP phase produced is sent to a fractionation plant already producing TOP being processed by a method according to the present invention to provide a recirculation of modified TOP.

Moreover, according to yet another specific embodiment, said at least part of the modified, i.e. thermally or hydrothermally treated, TOP phase is sent, alone or together with CTO or CTO blends, such CTO or CTO blends preferably comprising CTO with an acid value below about 140, to a fractionation plant for further refining of the modified TOP phase. This is further discussed below with reference to FIG. 5.

Furthermore, according to one embodiment, at least part of the modified i.e. thermally or hydrothermally treated, TOP phase produced and/or at least part of the TOP depleted in components having boiling point between 150-450° C. e.g. fatty- and rosin acid material is sent to a petroleum refinery for further processing to advanced biofuel or used as a bio-oil for burning. In line with the above, according to one specific embodiment of the present invention, at least part of the thermally or hydrothermally treated TOP in a subsequent step is sent to a fractionation plant comprising at least an evaporator and a condenser, said fractionation plant separating the TOP feed into at least one stream rich in components of low molecular weight such as molecular weight in the range 200-330 g/mol and one stream rich in tall oil pitch. Furthermore, according to yet another embodiment gases and volatile components having boiling points below 150° C. is separated off before at least part of the thermally or hydrothermally treated TOP is sent to a fractionation plant.

Figure 5:
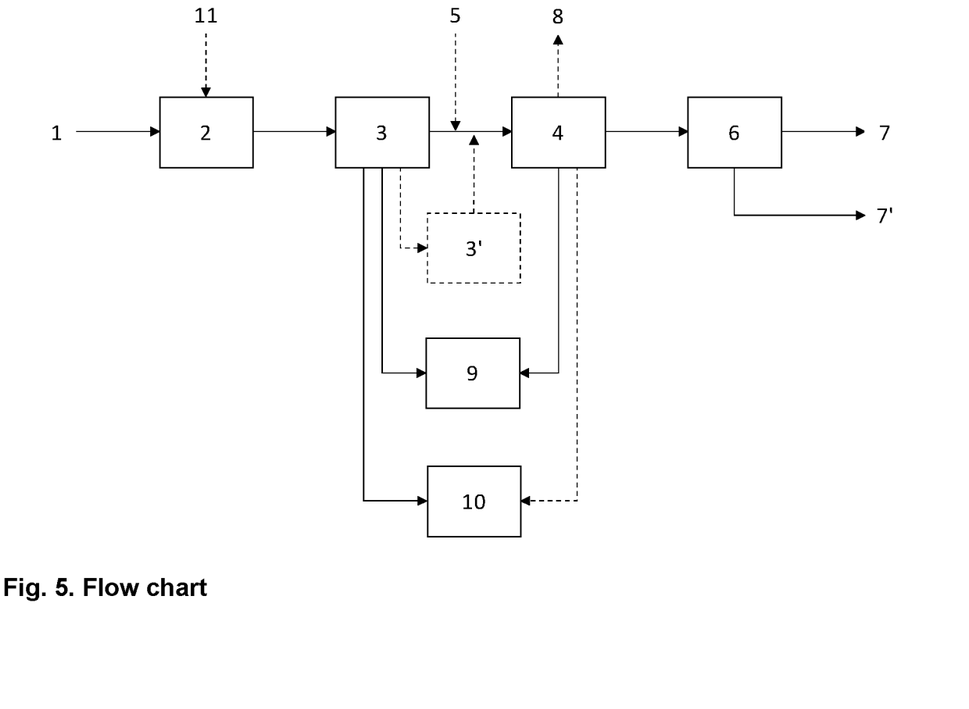
FIG. 5 shows a flow sheet describing certain embodiments how the process for treating tall oil pitch may be implemented and where the thermally and/or hydrothermallly treated i.e. modified TOP may be sent for further processing.

Furthermore, according to one embodiment of the present invention at least part of the modified TOP phase produced and/or wherein at least part of a modified TOP phase produced in a fractionation plant for further refining of the modified TOP phase is sent to a petroleum refinery for further processing or as a bio-oil for burning. Moreover, according to another embodiment, the modified TOP, directly or indirectly after further fractionation, and optionally other treatments for impurity removal, is used as biofuel or as a renewable feedstock to a cracker unit in a petroleum refinery. Therefore, according to one specific embodiment of the present invention modified TOP, directly or indirectly after further fractionation and optionally other treatments, such as e.g. ash removal, is used as biofuel or as a renewable feedstock to a cracker unit in a petroleum refinery. These and other alternative embodiments are illustrated in FIG. 5.

According to another specific embodiment, the TOP is thermally treated in the reactor at a temperature of at least 320° C. Regarding optimal temperature ranges as function of residence time, reference should be made to the subsequent description of experiments and results given in the respective figures/tables. As is evident from the experimental part, there is a clear linkage between the used temperature and residence time for the thermal treatment according to the present invention.

According to yet another specific embodiment of the present invention, the temperature in the reactor is maintained in the range of 300-375° C. during the thermal treatment. It should be noted that the present invention may be performed at higher temperatures, even up to and about 500° C. during shorter residence time, but this is normally not preferable with reference to the TOP fraction profile and yield being produced. This is further discussed below.

According to yet another embodiment, the residence time during the thermal treatment varies but is at least 10 minutes. Moreover, according to one other embodiment, the residence time during the thermal treatment is in the range of 10-150 minutes. Furthermore, according to yet another specific embodiment according to the present invention, the temperature of the TOP during the thermal treatment and the residence time thereof are in the range of from a lower temperature of 300° C. and longer residence time of 180 minutes to a higher temperature of 400° C. and shorter residence time of 10 minutes, such as e.g. from (300° C. and 180 minutes) to (375° C. and 10 minutes), e.g. from (300° C. and 120 minutes) to (375° C. and 10 minutes).

Furthermore, it is not only a TOP fraction with lower viscosity which is being produced during the TOP treatment. Also, a gaseous mixture containing different components is produced. Rosin acids tends to be at least partially decarboxylated at temperatures over about 280° C. The rosin oil produced in this manner has a lower boiling point and viscosity than the rosin acids. The profile of the mixture is dependent on the conditions, such as temperature and residence time. Gaseous components being produced are among others methane, propane, carbon mono- and dioxide, as well as hydrogen sulfide and other organic sulfides. According to one embodiment of the present invention, a gaseous phase is produced along with the modified TOP, is separated from the modified TOP phase and utilized for energy generation.

The thermal treatment according to the present invention may be performed in different ways and with additional means. According to one embodiment, the thermal treatment is performed in one single step. Furthermore, according to yet another embodiment, the method is performed in the presence of a catalyst. Possible examples are different types of metal oxides, such as but not limited to iron and aluminum oxides. Moreover, according to another embodiment, the method is performed in the presence of hydrogen gas or a component acting as hydrogen donor. Moreover, also solvents may be present. Therefore, according to one embodiment, the method is performed in the presence of a solvent, e.g. water, an alcohol or a combination thereof. It is particularly advantageous to perform the thermal treatment of TOP in the presence of water or steam. The amount of water or steam added to the TOP composition can be from 1% to 20% calculated as weight of the TOP. As alluded to above such water addition may have several functions besides further lowering the viscosity of the TOP. Based on the above, according to one specific embodiment of the present invention, the method is performed by aid of addition of water and/or stream.

Besides the TOP fraction as a whole and a gaseous phase, also other components may be produced, which of course also can be seen as part of the TOP fraction. According to one specific embodiment, at least a portion of a low boiling point phase, below 450° C. comprising the thermally or hydrothermally treated (modified TOP) is separated. Moreover, according to yet another embodiment, an aqueous fraction containing salts is separated from the produced modified TOP phase subsequent to a washing operation of the modified TOP phase. The aqueous fraction being separated off may be further processed or recycled. Moreover, if the thermal treatment according to the present invention is performed in the presence of water the viscosity reduction and salt removal may be performed in one step.

Moreover, as mentioned water or steam may be added to the TOP prior to or during the thermal treatment. In addition to promoting hydrolysis of mainly ester bonds the presence of water or steam prevents re-esterification reactions and other undesired condensation reactions. In addition, an aqueous phase may be present to promote the separation of components in an aqueous phase and an oil phase, respectively. Therefore, according to one specific embodiment, the TOP to be treated is combined with an aqueous phase before the thermal treatment, and wherein the method then promotes the formation of one oil phase enriched in lighter TOP components and one aqueous phase. Any salts or ash present in the TOP will dissolve into the aqueous phase and not follow the organic oil TOP fraction. Also, some other impurities more soluble in the aqueous phase than in the oily low viscous TOP phase may be separated off from the TOP in this way.

Furthermore, according to yet another embodiment of the present invention, the hydrothermally modified TOP oil phase enriched in lighter components and the aqueous phase are separated from each other. The separation technique used may be centrifugation or settling followed by decantation. The formed oil phase enriched in lighter TOP components may be further fractionated as disclosed above.

Moreover, the method according to the present invention has several possible applications. According to one embodiment, the formed oil phase enriched in lighter TOP components is, directly or indirectly after separation of heavy and high boiling TOP components (boiling above about 450° C. at atmospheric pressure) and optional washing for removal of salts and other impurities, further processed to a biocomponent suitable for the production of a fuel, such as gasoline, jet-fuel or diesel. In this regard, "further processed" should be seen as to include all standard refinery operations needed to modify the molecules so that they comply to the stringent specifications of gasoline, jet-fuel or diesel. In such a case, the fraction may need to be processed to remove all heteroatoms i.e. anything else than carbon and hydrogen being present within the obtained oil phase, which is normally done in one or more stages with hydrothermal treatment in presence of catalyst and hydrogen gas, often referred to as hydrogenation. Furthermore, the molecules might need to be rearranged to adjust a number of physical properties such as viscosity, cloud & pour points, cetane number (diesel)/octane number (gasoline)/freezing point for jet-fuel, etc. where these properties can be achieved by other standard refinery operations also conducted in the presence of hydrogen gas such as cracking, isomerization, etc. Specifically, a heavy TOP wherein most of the rosin and fatty acid component and optionally sterols have been separated and which heavy TOP is substantially free from salts, ash and other impurities will be a suitable renewable feedstock to a fluid catalytic cracker or a hydrocracker unit in a petroleum refinery.

EXAMPLES AND DESCRIPTION OF THE DRAWINGS

Figure 1:
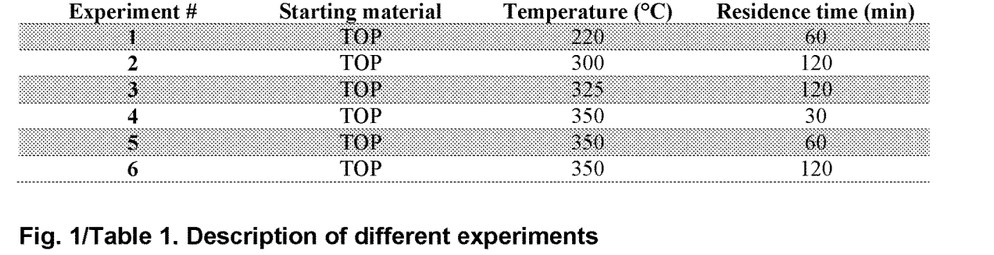
FIG. 1 is a table showing a number of experimental conditions.

Trials have been performed in a stirred tank reactor from PARR Instrument Company, USA. The total volume of the reactor was 500 ml, the maximum temperature 500° C. and the maximum pressure 345 bar (see FIG. 1/table 1). TOP obtained from SunPine AB, Piteå, was used as the starting material.

TOP at room temperature is difficult to handle/process. To simplify the transfer to the reactor, TOP was pre-heated, then added to the reactor, about 100 g, and then the reactor was given an inert condition by use of nitrogen gas. Then the reactor was heated to the intended temperature. Different parameters were studied in accordance with FIG. 1/table 1. When the intended residence time had passed the reactor was cooled with a fan, and when the temperature was about 60° C. a gas sample was taken to an external vessel. The heating and cooling took about 70 minutes each.

The analysis of the product was made visually directly and after 24 hours in room temperature. The visual inspection involved easy to stir and flow properties were studied. Quantitative measurements of viscosity, acid number and rosin content were in accordance with standardized measuring methods.

The initial trials were made at 220° C. In these cases, no relevant change in behavior was detected visually. At 300° C., there was a change detected, which was even clearer at 350° C.

Figure 2:
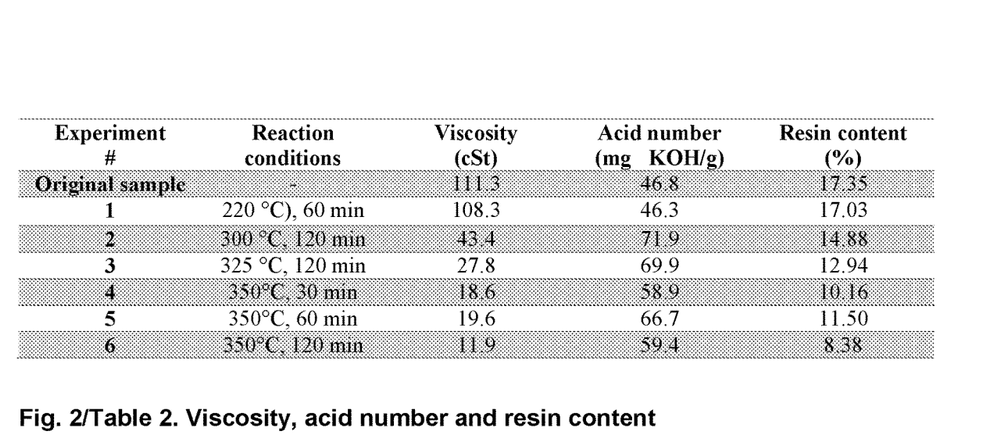
FIG. 2 is a table showing the results of the conditions of FIG. 1.

The results from the quantitative measurements namely, viscosity, acid number and rosin content (by standard method approved by Pine Chemicals Association, PCTM 17) were analyzed for respective samples and are listed in FIG. 2/table 2. The observations were also made through visual inspection. Viscosity, acid number and rosin content of the original sample and the sample run at 220° C. are very similar. At a residence time of 2 hours there is first obtained an increase in the acid number at a thermal treatment of 220° C., and then the acid number is decreased with increasing temperature. The rosin content decreases with increasing temperature assumedly due to decarboxylation.

Figure 3:
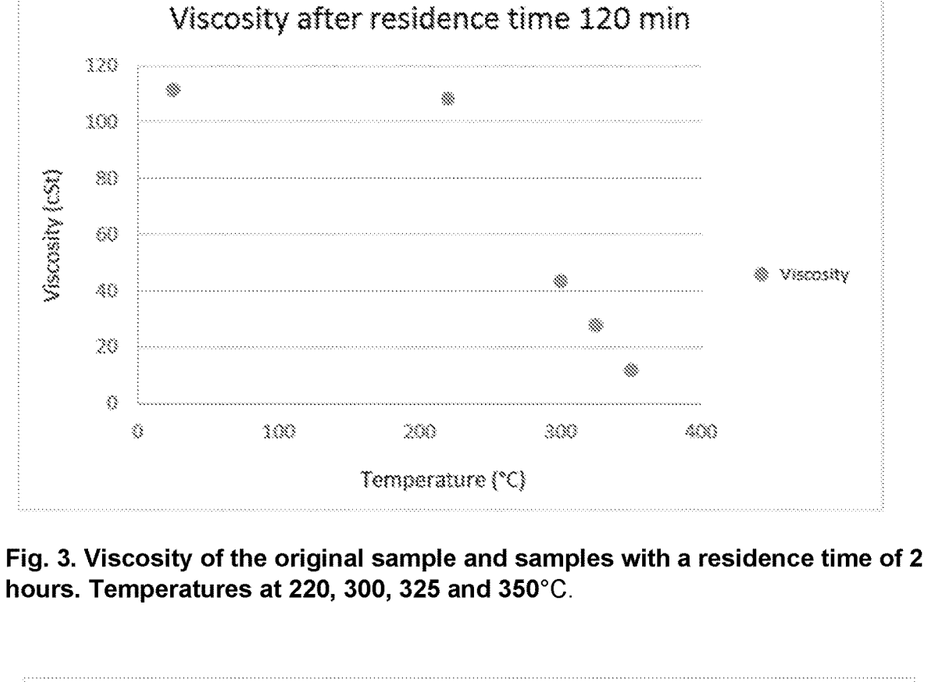
FIG. 3 shows the viscosity of the treated tall oil pitch as a function of temeprature.
Figure 4:
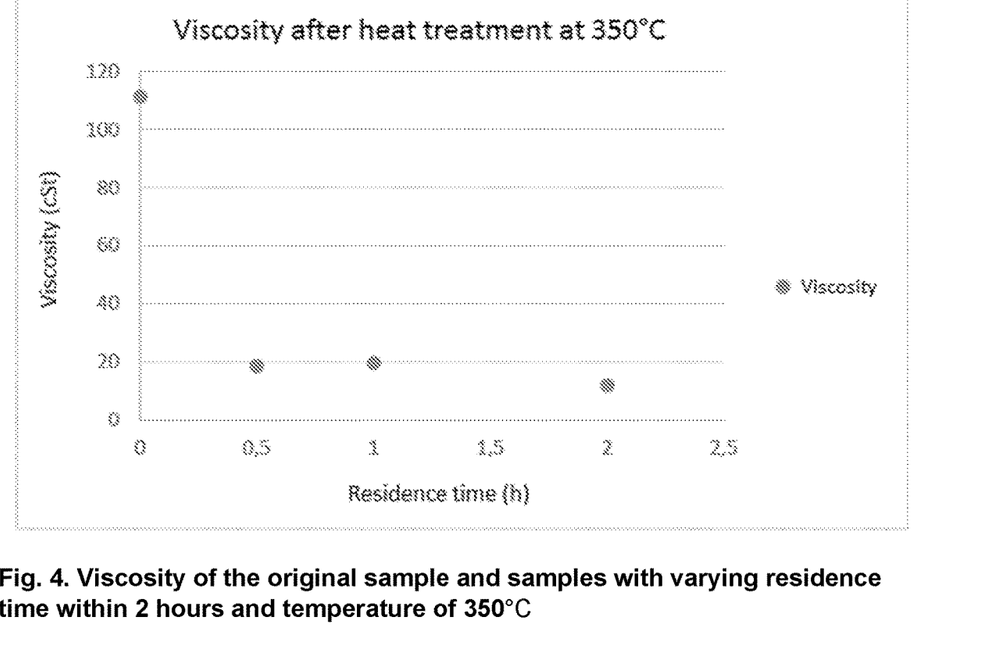
FIG. 4 shows the viscosity of the treated tall oil pitch as a function of residence time.

FIGS. 3 and 4 show viscosity as a function of residence time and temperature, respectively. It is clear that the viscosity changes significantly already at 300° C.

Also, the gases produced were analyzed and the yield was measured. At higher temperatures, the produced gas volume increased. The total yield was very high for all experiments (although some material remained on the reactor walls, the recovered material gave yield values ranging between 94-99%).

The performed experiments demonstrate the positive results which can be achieved by the method according to the present invention. Already at temperatures around 300° C. a clear viscosity decrease was obtained, where the lowest viscosity was obtained at a temperature of 350° C. in the current experimental series. At comparatively high temperatures, such as above 400° C., the gas production increases, while the oil yield decreases, which may be a disadvantage.

A larger reactor (with total volume of 2 liters) was used to somewhat scale up the tests. The trials confirm the results from the initial studies using a smaller batch reactor and discussed above. The use of a larger reactor enabled sampling at shorter residence times. The results show that the viscosity could be altered at 350° C. using very short residence times, such as about 12 min (the reactor design refrained from obtaining samples earlier than 12 min). Residence times down to at least 10 minutes are possible according to the present invention, i.e. when the temperature is high enough.

The same TOP material was treated in a continuous mode as well using continuously stirred tank reactor with total volume of 2 liters and at two different temperatures, namely 350° C. and at 375° C. Similar results as batch tests were obtained where the viscosity could be lowered from 92 cSt for initial TOP to well below 20 cSt and maintained throughout the duration of the tests.

In FIG. 5 there is shown a flow sheet describing certain embodiments how the present invention may be implemented and where the thermally and/or hydrothermally treated i.e. modified TOP may be sent for further processing.

CTO is typically refined in a fractionation plant of varying complexity where the fatty- and rosin acid components are fractionated to various product streams satisfying different specifications, e.g. different grades tall oil fatty acids (TOFA), different grades of tall oil rosin acids (TOR), and mixtures thereof including refined tall oil diesel (RTD). Always, however, there is remaining material after fractionation, namely heavy (high boiling point) TOP fraction denoted as 1 within FIG. 5, which fraction is then advantageously used as feedstock and treated according to the present invention.

FIG. 5 depicts different routes for treating the TOP stream, i.e. stream 1. Thus TOP, is thermally and/or hydrothermally treated, a process step depicted as 2 in FIG. 5. After this step, the modified TOP of lower viscosity is obtained, denoted as 3 within FIG. 5. The improved viscosity of the modified TOP as result of the treatment according to the present invention enables several options for the further processing.

One option for treating the modified TOP is to be sent to a fractionation plant, an option denoted as 4 within the FIG. 5. This fractionation plant could be any fractionation plant designed for processing CTO and/or could be a dedicated fractionation plant of lower complexity, such as a plant being able to produce at least three fractions from an incoming stream, said fractions being (i) low boiling point fraction comprising components with boiling points below 150° C.; (ii) fraction comprising components with boiling points between 150-450° C. and (iii) a high boiling point fraction comprising components with boiling points above 450° C. at atmospheric pressure. The incoming stream can be a stream comprised of modified TOP, modified TOP blended with low quality CTO (acid number below 140 or preferably below 130) and/or low quality CTO alone (optional addition of low quality CTO is denoted as 5 within FIG. 5). It is to be understood that when 4 is dedicated fractionation plant, the plant could be adjacent to the CTO processing plant already producing TOP or could be placed elsewhere. In cases when there are two adjacent plants, several synergies could be obtained and utilized, for example energy needed for fractionation could be reduced substantially by intelligently exchanging incoming and product streams.

When 4 is a CTO fractionation plant, i.e. modified TOP is recirculated, the stream 3 could optionally be treated prior subjecting to fractionation, route shown with dashed lines and where the 3' denotes additional treatment of modified TOP. This additional treatment comprises of steps which preferably target the removal of salts and other impurities i.e. steps such as but not limited to washing, phase separation, de-watering, removal of components with boiling points below 150° C., de-pitching, etc. thus preventing the accumulation of impurities and color components within valuable fractions, TOFA, TOR, etc.

The fractionation step 4 itself yields at least three distinct streams. 6 denotes stream comprised of components with boiling points between 150-450° C. Depending on the complexity of the fractionation plant 4, the stream 6 could be refined to tall diesel stream 7 used for biofuel production in a conventional refinery but it could be several TOFA and/or TOR streams 7' of different grades utilized in variety of formulations within chemical industry.

The other distinct stream is the stream denoted with 8, comprised of components having low boiling points such as less than 150° C. at atmospheric pressure in the case when 4 is a dedicated fractionation plant. In cases when 4 is a fractionation plant of higher complexity the stream 8 may comprise of components having higher boiling points (as being separated as top streams from different columns) and may be more than one fraction. Within the art of CTO fractionation, the collective term for stream 8 is tall oil heads.

Another distinct stream from the processing of the modified TOP stream is the heavy bottom fraction essentially depleted in valuable tall oil components. As the stream has been depleted in acidic/active components which might accelerate coke formation as well as tall oil ash and other impurities have been removed preferably employing 3' through 4 route makes this heavy bottom fraction an attractive feedstock for cracker unit at conventional oil refinery. This option for further refining of the modified TOP is denoted with 9 within FIG. 5. Through suitable diluting/dosing the modified TOP itself might be fed into the cracker unit without any refining either via 3-4 route nor the 3'-4 routes.

FIG. 5 depicts yet another option for utilization of a modified TOP stream as the viscosity has been lowered. This option is presented as stream 10 which is either directly sent to a user for energy generation after the thermal and/or hydrothermal treatment according to the present invention (3-10) or the heavy bottom fraction from fractionation step 4 is sent to a user for energy generation.

An optional addition point 11 is depicted within FIG. 5. The point enables the addition of steam, water, solvent, catalyst, etc. as discussed earlier when describing the specific embodiments of the present invention. When TOP is hydrothermally treated, i.e. water is added through 11, then the optional 3' step is obsolete as the TOP viscosity is lowered and purified in one and same step as ash and other impurities are separated from the modified TOP.

The invention claimed is:

1. Method for the treatment of tall oil pitch (TOP), said method comprising:
heating the TOP in a reactor to a temperature of at least 300° C.;
cracking high molecular weight components in the TOP while maintaining the temperature in the reactor at 300° C. or higher under a period of time sufficient to enable said cracking, generating fatty acids and/or rosin acids, and/or derivatives thereof, and/or unsaponifiables and/ or their derivatives, which have lower molecular weight compared to the high molecular weight components in the original TOP, thereby yielding a modified TOP phase having lower viscosity compared to the original TOP.

2. Method according to claim 1, wherein the original TOP and components therein has an average molecular weight substantially above 350 g/mol and the generated fatty acids and/or rosin acids, and/or derivatives thereof, and/or unsaponifiables and/or their derivatives have an average molecular weight below 350 g/mol.

3. Method according to claim 1, wherein the TOP to be treated is a fraction obtained and separated during the processing of crude tall oil (CTO) in a fractionation plant.

4. Method according to claim 1, wherein the TOP to be treated comprises a fraction of low acid value crude tall oil having an acid number below about 140.

5. Method according to claim 1, wherein the cracking comprises thermal treatment in the reactor at a temperature of at least 320° C.

6. Method according to claim 1, wherein the temperature in the reactor is maintained in the range of 300-375° C. during the cracking.

7. Method according to claim 1, wherein the residence time during the cracking is at least 10 minutes.

8. Method according to claim 1, wherein the residence time during the cracking is in the range of 10-150 minutes.

9. Method according to claim 1, wherein the temperature of the TOP during the cracking are in a range of from a lower temperature of 300° C. to a higher temperature of 400° C., with a cracking residence time of 10 minutes to 180 minutes.

10. Method according to claim 1, wherein a gaseous phase produced along with the modified TOP, is separated from the modified TOP phase and utilized for energy generation.

11. Method according to claim 1, wherein the cracking is performed in one step.

12. Method according to claim 1, wherein the method is performed in the presence of a catalyst.

13. Method according to claim 1, wherein the method is performed in the presence of a solvent.

14. Method according to claim 13, wherein the solvent is water, an alcohol or a combination thereof.

15. Method according to claim 1, wherein the method is performed by aid of addition of water and/or steam.

16. Method according to claim 1, wherein at least part of the cracked TOP is sent to a fractionation plant producing TOP.

17. Method according to claim 1, wherein at least part of the cracked TOP is sent to a fractionation plant comprising at least an evaporator and a condenser, said fractionation plant separating the TOP feed into at least one stream rich in components of low molecular weight in the range 200-330 g/mol and one stream rich in tall oil pitch.

18. Method according to claim 17, wherein gases and volatile components having boiling points below 150° C. is separated off before at least part of the cracked TOP is sent to a fractionation plant.

19. Method according to claim 16, wherein said at least part of the modified TOP phase produced is sent to a fractionation plant producing TOP to provide a recirculation of modified TOP.

20. Method according to claim 16, wherein said at least part of the modified TOP phase produced is sent, alone or together with CTO or CTO blends, to a fractionation plant for further refining of the modified TOP phase.

21. Method according to claim 1, wherein at least part of the modified TOP phase produced and/or wherein at least part of a modified TOP phase produced in a fractionation plant for further refining of the modified TOP phase is sent to a petroleum refinery for further processing or as a bio-oil to burning.

22. Method according to claim 20, wherein modified TOP, directly or indirectly after further fractionation, and optionally other treatments, is used as biofuel or as a renewable feedstock to a cracker unit in a petroleum refinery.

23. Method according to claim 1, wherein an aqueous fraction containing salts is separated from the produced modified TOP phase subsequent to a washing operation of the modified TOP phase.

24. Method according to claim 1, wherein the TOP to be treated is combined with an aqueous phase before the thermal treatment, and wherein the method then promotes the formation of one oil phase enriched in lighter TOP components and one aqueous phase.

25. Method according to claim 24, wherein the formed oil phase enriched in lighter TOP components and the aqueous phase are separated from each other.

26. Method according to claim 24, wherein the formed oil phase enriched in lighter TOP components is separated from a heavy TOP fraction and directly or indirectly further processed to a bio-component suitable for the production of a fuel.

* * * * *